(12) United States Patent
Girit et al.

(10) Patent No.: US 8,033,445 B1
(45) Date of Patent: Oct. 11, 2011

(54) NANO-SOLDERING TO SINGLE ATOMIC LAYER

(75) Inventors: Caglar O. Girit, Berkeley, CA (US); Alexander K. Zettl, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 518 days.

(21) Appl. No.: 12/270,643

(22) Filed: Nov. 13, 2008

Related U.S. Application Data

(60) Provisional application No. 60/987,451, filed on Nov. 13, 2007.

(51) Int. Cl.
*B23K 31/02* (2006.01)

(52) U.S. Cl. .................. 228/179.1; 228/180.5; 228/256

(58) Field of Classification Search ........................ None
See application file for complete search history.

(56) References Cited

U.S. PATENT DOCUMENTS

| | | | |
|---|---|---|---|
| 6,251,767 B1 * | 6/2001 | Heinen ........................ 438/616 |
| 2004/0168527 A1 * | 9/2004 | Nakayama et al. ......... 73/864.41 |
| 2005/0048697 A1 * | 3/2005 | Uang et al. .................... 438/108 |
| 2006/0175601 A1 * | 8/2006 | Lieber et al. .................... 257/19 |
| 2007/0014148 A1 * | 1/2007 | Zhou et al. .................... 365/158 |
| 2007/0035724 A1 * | 2/2007 | Banin et al. .................... 356/236 |
| 2007/0281156 A1 * | 12/2007 | Lieber et al. .................. 428/373 |
| 2008/0038538 A1 * | 2/2008 | Ruby ............................. 428/323 |
| 2009/0082216 A1 * | 3/2009 | Cohn et al. ........................ 506/9 |
| 2009/0299213 A1 * | 12/2009 | Patolsky et al. ............... 600/554 |
| 2010/0058500 A1 * | 3/2010 | Kim et al. ....................... 850/42 |
| 2011/0001392 A1 * | 1/2011 | Masmanidis et al. .... 310/316.03 |

OTHER PUBLICATIONS

Girit et al., "Soldering to a single atomic layer," Applied Physics Letters, vol. 91, Issue No. 19, pp. 193512-1-193512-3, (Nov. 9, 2007).
Rai-Choudhury et al., "Electron Beam Lithography," Handbook of Microlitography, Micromachining, and Microfabrication, vol. 1, Chapter 2, pp. 139-231, (Mar. 1997).
Stern et al., "Methods of fabricating Ohmic contacts to nanowires and nanotubes," Journal of Vacuum Science Technology B, vol. 24, Issue No. 1, pp. 231-236, (Jan. 19, 2006).
Staley et al, "Lithography-free fabrication of graphene devices," Applied Physics Letters, vol. 90, Issue No. 14, pp. 143518-1-143518-3, (Apr. 6, 2007).
Tan et al., "Measurement of Scattering Rate and Minimum Conductivity in Graphene," Physical Review Letters, vol. 99, Issue No. 24, pp. 246803-1-246803-4, (Dec. 14, 2007).
Schedin et al., "Detection of individual gas molecules adsorbed on graphene," Nature Mateials, vol. 6, Issue No. 9, pp. 652-655, (Jul. 29, 2007).

* cited by examiner

*Primary Examiner* — Kiley Stoner
(74) *Attorney, Agent, or Firm* — Lawrence Berkeley National Laboratory; Leonard T. Guzman

(57) ABSTRACT

A simple technique to solder submicron sized, ohmic contacts to nanostructures has been disclosed. The technique has several advantages over standard electron beam lithography methods, which are complex, costly, and can contaminate samples. To demonstrate the soldering technique graphene, a single atomic layer of carbon, has been contacted, and low- and high-field electronic transport properties have been measured.

16 Claims, 2 Drawing Sheets

NANO-SOLDERING TO SINGLE ATOMIC LAYER

STATEMENT OF GOVERNMENTAL SUPPORT

The invention described and claimed herein was made in part utilizing funds supplied by the U.S. Department of Energy under Contract No. DE-AC02-05CH11231 and in part utilizing funds supplied by the National Science Foundation. The Government has certain rights in this invention.

BACKGROUND OF THE INVENTION

This invention relates generally to joining of small structures, and, more specifically, to making electrical contacts to nanostructures.

The conventional method used to contact nanostructures electrically is electron beam lithography. While having good resolution, the procedure is complex, expensive, and time-consuming. Moreover, the polymer resists and solvents used in the process leave residues that often contaminate the sample or device. As a result, the major contribution to the device resistance is not from the sample itself, but from the contact. While lithography-free contacting techniques have been developed, such as with the use of shadow masks, they have their drawbacks. It would be useful to have a method to contact nanostructures electrically that is simple, robust, inexpensive, suitable for large-scale manufacturing, and that does not introduce contamination.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The preferred embodiments are illustrated in the context of making electrical contacts to nanostructures. The skilled artisan will readily appreciate, however, that the materials and methods disclosed herein will have application in a number of other contexts where joining of small structures is desirable, particularly where low cost and contamination-free joining are important.

In one embodiment of the invention, a method of joining nanostructures uses a miniaturized soldering technique. Surprisingly, with this technique sub-micron sized, ohmic contacts to nanostructures of even single-atom thickness can be made. The technique is simple, inexpensive, rapid, and entirely avoids sample contamination.

Figure 1:
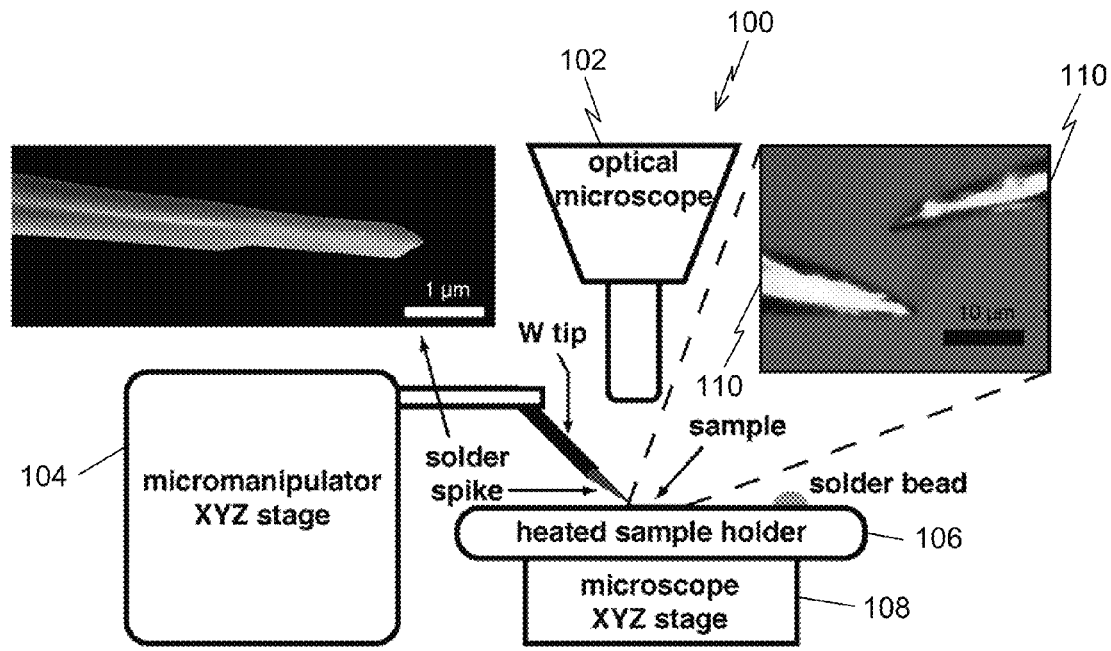
FIG. 1 is a schematic diagram of a nano-soldering system used to contact nanostructures. A scanning electron microscope image in the upper left of the figure shows an indium solder spike ending in a 50 nm radius tip (scale bar, 1 µm). An optical microscope image in the upper right shows a contacted graphene device (scale bar, 10 µm).

FIG. 1 is a schematic diagram that shows a nano-soldering system 100, according to an embodiment of the invention. Components of the system include an optical microscope 102, a micromanipulator 104, and a heated sample holder 106 on a microscope stage 108. The micromanipulator 104 and the microscope stage 108 may each have an xyz stage. A scanning electron microscope image in the upper left shows an indium solder spike ending in a 50 nm radius tip (scale bar, 1 µm). An optical microscope image (scale bar, 10 µm) in the upper right shows a graphene sheet (grey region) with two indium contacts (bright spike regions).

In one embodiment of the invention the sample to be contacted is placed on a substrate on the sample holder along with a small bead of indium. In one arrangement, the temperature of the sample holder is raised to about 170° C., twenty degrees above the melting point of indium. In other arrangements, the temperature of the sample holder can be raised to between about 150 and 200° C. A tungsten tip at room temperature is inserted into the molten indium bead using the microscope XYZ translation stage and the micromanipulator XYZ translation stage, and a spike of solder is pulled out slowly. Sub-micron spike tips (FIG. 1, SEM image) are possible with careful adjustment of the temperature and pullout rate. The sample and spike tip are then successively positioned and aligned under the microscope using both XYZ stages. The microscope stage is then raised quickly, fusing the solder spike onto the sample and substrate as they come into contact. Once all contacts are made, the sample heater is turned off and the contacts solidify as shown in the optical image in the upper right in FIG. 1.

In other arrangements, other low-temperature melting point alloys of indium and tin (Indalloy 1E, 4, 121, 182, 290) are used to make contacts. Indium can be especially useful because of its good adhesion to silicon oxide, a common substrate or substrate surface layer. Any metal or alloy whose melting point is significantly lower than the lowest temperature at which the nanostructures or substrate to be contacted begin to undergo an undesirable change (e.g., oxidation, melting, decomposition) can be used in the embodiments of the invention. In one example, carbon nanostructures, which undergo significant oxidation in air only above 350° C., can be paired with solders that have eutectic or melting points in the range 118-280° C.

With conventional (macro) soldering, flux and inert or forming gases are used to ensure good bonding. Flux and flux-bearing solders can be undesirable for making electrical contact at the nanoscale, as they can introduce contaminant residues onto the samples. Surprisingly, it has been found that excellent bonds can be formed using the nano-soldering techniques disclosed herein without flux and/or inert or forming gases. It may be that because the tungsten tip is at room temperature when it draws out the solder spike, oxidation of the solder spike is minimal. Sample oxidation is also negligible for carbon nanostructures, since oxidation in air is significant only above 350° C., and solders with eutectic or melting points in the range 118-280° C. are used. Nano-solder contacts have been found to be extremely reliable and robust.

Graphene (single sheets of graphite) has garnered much attention due to its interesting physics and its promise for a variety of applications. In one exemplary embodiment, graphene sheets are extracted by micromechanical exfoliation. Single graphene sheets are identified optically by contrast analysis and by the shape of the D peak in Raman spectra made from the samples. Once a graphene sheet is isolated, contacts can be nano-soldered to produce a working device within minutes using the method described herein. A typical optical image of a nano-solder contacted graphene device with two terminals is shown in the upper right corner of FIG. 1. In one exemplary embodiment graphene samples are usually about 10-20 μm in size with contact separations as small as several microns.

Figure 2:
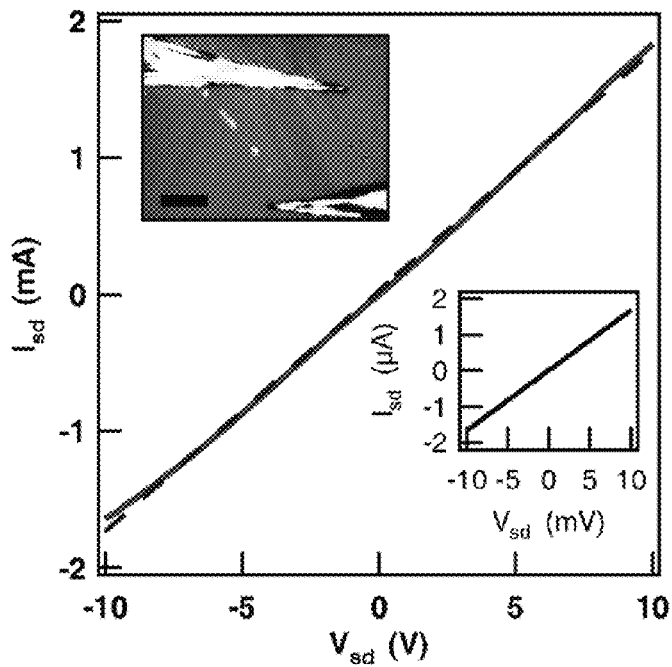
FIG. 2 is a graph showing the current-voltage I-V characteristic of the solder-contacted graphene device shown in the optical image in the inset (source-drain voltage $V_{sd}$ in the range ±10 V; scale bar, 10 µm). The dashed line is a linear fit, indicating a high-bias resistance of 5.7 kΩ. The plot in the inset is a low-bias curve of same device, with a resistance of 6.0 kΩ. The back-gate voltage $V_{bg}$=0 V.

FIG. 2 is a plot of the source-drain current $I_{sd}$ of a nano-soldered graphene device (shown in the optical image in the inset; scale bar is 10 μm) measured as a function of source-drain voltage $V_{sd}$ in the range ±10 V at room temperature in ambient conditions. The I-V characteristic is linear even up to high source-drain voltages. The resistance of the device is 5.7 kΩ, as determined from a linear fit to the data (shown by the dashed line). The other inset, an I-V curve of the same device taken in the range $V_{sd}$=±10 mV, has a low-bias resistance of 6.0 kΩ, nominally different from the high-bias resistance. The back-gate voltage $V_{bg}$ is 0 V.

Taking device geometry into account, a lower bound on the current carrying capacity of graphene in air on a silicon oxide substrate can be placed at about 390 A/m sheet or 120 MA/cm² bulk assuming a graphene thickness of 3.35 Å, the graphite interlayer spacing. This bulk current carrying capacity, more than one hundred times that of a superconductor, is comparable to that of multi-wall carbon nanotubes, roughly $10^9$ A/cm². In vacuum ($10^{-5}$ mbar), current densities as high as 500 A/m have been observed without device failure. Assuming zero contact resistance and diffusive transport, the power density of the device in FIG. 2 is 16 kW/cm², more than two orders of magnitude larger than current processor heat flux. With such high current carrying capacities and power densities, it is possible to construct graphene electronic devices that do not have heat dissipation problems.

Figure 3:
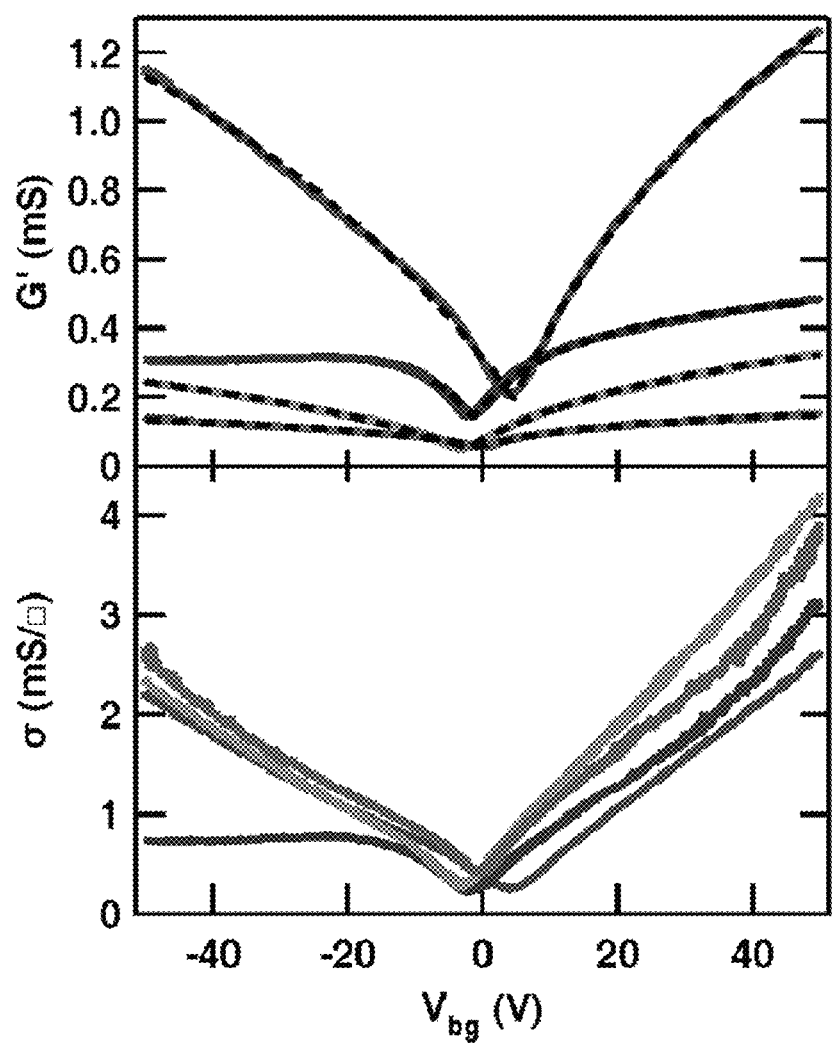
FIG. 3a shows plots of as-measured two-terminal conductance $G'(V_{bg})$ for four solder-contacted graphene devices. The dashed black-lines have been fitted to the data with a modified Drude model as described below.
FIG. 3b shows plots of sheet conductivities for the same devices obtained by subtracting the contact resistance as determined from the fits and accounting for the different device aspect ratios.

FIG. 3a shows plots of two-terminal conductances G' for four soldered devices measured as a function of back-gate voltage $V_{bg}$ at room-temperature in vacuum. The dashed black-lines are fits to the data with a modified Drude model as described below. All graphene samples, identically prepared and nano-solder contacted without any annealing or processing, are remarkable in that their Dirac points $V_D$ (the location of the conduction minimum) are within five volts of $V_{bg}$=0 V. This is in contrast to electron-beam lithographed devices, where $V_D$ in the tens of volts is common. The clean, solder-contacted samples, without lithography residues to charge the sample and shift the Dirac point away from zero, are at least neutral, if not undoped. This is the first indication of how processing parameters influence device characteristics.

Without wishing to be bound to any particular theory, this analysis is offered as one possibility for understand the surprising results described herein. Although these measurements have been made using only two terminals, we can estimate the effective, or device mobility, the minimum conductivity, and the contact resistance with a simple model. We relate the Drude equation, σ=enμ with σ the conductivity and n the carrier density, to the conductance using σ=GL/W. The experimentally measured conductance G' includes the contact resistance $R_c$ via $1/G'=R_c+1/G$. For graphene in a standard transistor geometry, the carrier density depends on the back-gate voltage as n=c'|$V_{bg}-V_D$|/e, where the specific capacitance c' for a 300 nm silicon oxide gate thickness is 115 aF/μm². Finally, we add a phenomenological parameter $\sigma_D$ to account for the non-zero minimum conductance and allow differing electron and hole mobilities $\mu_e$, $\mu_h$ to obtain $$\frac{1}{G'} = R_c + \frac{L/W}{c'\mu_{e,h}|V_{bg} - V_D| + \sigma_D} \quad (1)$$

using $\mu_e$ for back-gate voltage $V_{bg} \geq V_D$ and $\mu_h$ in the range $V_{bg}<V_D$. The aspect ratio L/W is determined from optical images of the devices. In general, this model overestimates the contact resistance, as any intrinsic sub-linearity in the conductance-gate voltage curves contributes to $R_c$. While the data can also be fit to more fundamental theories, the simple model may suffice to characterize the graphene devices.

Having extracted the contact resistance from the curve fitting in FIG. 3a (dashed black lines), the sheet conductivities for the same devices, σ=L/W(1/G'-$R_c$) is plotted as a function of $V_{bg}$ in FIG. 3b. The sheet conductivities are obtained by subtracting the contact resistance as determined from the fits and accounting for the different device aspect ratios.

The conductivity curves are relatively linear for almost all devices, indicating the fit is good. The plots show that the mobilities (slopes of the curves) and minimal conductivities are roughly the same for all devices. The electron mobilities range from 4500-6200 cm²/V·s and hole mobilities range from 3000-3600 cm²/V·s, showing much less variation than in electron-beam lithography defined devices. The minimal conductivities are 210 μS, 230 μS, 300 μS, and 440 μS. The contact resistance per lead, measured for nine devices, varied from 190-1700Ω, with mean 680Ω and standard deviation 450Ω, comparable to the best electron-lithography fabricated devices.

In another embodiment of the invention, the nano-solder contact method can be used to contact nanotubes, nanowires, nanospheres, or other linear or non-linear nanostructures. In one example, scanning electron microscopy (SEM) can be used to locate multi-wall carbon nanotubes relative to pre-defined optically visible markers. The nano-soldering technique, as described above, can then be used by positioning the leads relative to the markers. In another example, a piezo micromanipulator can be used inside the SEM itself, along with a heated sample stage, and the contacts can be soldered in situ.

In yet other embodiments, the nano-solder technique can be used for wirebonding and shadow mask alignment. To wirebond a device that already has a lead, the device is placed on a heated sample stage, a fine wire is placed near the lead and a solder spike is deposited, over both the lead and the wire. When the heat is turned off, the solidified spike fixes the wire to the substrate and provides electrical contact to the lead. The wirebonding and sample soldering can also be performed in a single step, with the solder spike both contacting the sample and fixing the wire. To align shadow masks, a similar process is used. The mask is placed on top of the substrate, over the sample, and soldered at the corners. The micromanipulator is then used to push the mask into alignment, and the heater turned off to fix the mask.

Solder contacts are a simple, efficient means of producing functional nanostructure devices, from graphene, nanotubes, or other materials. Not only are the contacts ohmic, but the resultant devices are clean and the device characteristics consistent. The contacts, capable of sustaining large currents without failure, also allow investigation of high-bias electronic transport properties.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A method of making contact to nanostructures, comprising the steps of:
   providing a melted solder bead;
   inserting a metal tip into the solder bead;
   pulling the metal tip out from the solder bead to form a submicron solder spike on the tip;
   providing a nanostructure on a heated holder;
   contacting the nanostructure with the solder spike to form a contact; and
   allowing the heated holder to cool so that the contact can solidify.

2. The method of claim 1 wherein the nanostructure is on a substrate and the contacting is between the nanostructure and the substrate.

3. The method of claim 1 wherein the nanostructure is a graphene sheet.

4. The method of claim 1 wherein the nanostructure is a linear nanostructure.

5. The method of claim 1 wherein the nanostructure is a non-linear nanostructure.

6. The method of claim 1 wherein the melted solder bead is on the heated holder.

7. The method of claim 1 wherein the metal tip is at room temperature before the inserting step.

8. The method of claim 1 wherein the solder comprises indium.

9. The method of claim 8 wherein the solder further comprises tin.

10. The method of claim 9 wherein the heated holder has a temperature between about 150° C. and 200° C.

11. The method of claim 10 wherein the heated holder has a temperature of about 170° C.

12. The method of claim 1 wherein the nanostructure comprises carbon and the heated holder has a temperature between about 110° C. and 300° C.

13. The method of claim 12 wherein the nanostructure comprises carbon and the heated holder has a temperature between about 118° C. and 280° C.

14. The method of claim 1 wherein the method is performed using an optical microscope.

15. The method of claim 1 wherein the method is performed in a scanning electron microscope.

16. A solder technique for wirebonding, comprising the steps of:
    providing a melted solder bead;
    inserting a metal tip into the solder bead;
    pulling the metal tip out from the solder bead to form a submicron solder spike on the tip;
    providing a device with a lead on a heated holder;
    positioning a fine wire near the lead;
    contacting the lead and the fine wire with the solder spike to form a contact; and
    allowing the heated holder to cool so that the contact can solidify.

* * * * *